United States Patent [19]
Taylor

[11] Patent Number: 6,058,961
[45] Date of Patent: May 9, 2000

[54] HIGH PRESSURE RELIEF VALVE

[76] Inventor: Julian S. Taylor, 8300 SW. 8th St., Oklahoma City, Okla. 73128

[21] Appl. No.: 09/395,436

[22] Filed: Sep. 14, 1999

[51] Int. Cl.$^7$ .................................................. F16K 17/14
[52] U.S. Cl. ........................................... 137/70; 137/68.11
[58] Field of Search ..................... 137/68.11, 70

[56] References Cited

U.S. PATENT DOCUMENTS

| | | | |
|---|---|---|---|
| 3,258,026 | 6/1966 | Weaver | 137/375 |
| 3,342,205 | 9/1967 | Quinto | 137/375 |
| 3,794,289 | 2/1974 | Taylor | 251/149.7 |
| 4,724,857 | 2/1988 | Taylor | 137/70 |
| 5,012,834 | 5/1991 | Taylor | 137/70 |
| 5,297,575 | 3/1994 | Taylor | 137/70 |
| 5,433,239 | 7/1995 | Taylor | 137/68.1 |
| 5,575,306 | 11/1996 | Taylor | 137/70 |
| 5,577,523 | 11/1996 | Taylor | 137/70 |
| 5,577,524 | 11/1996 | Taylor | 137/70 |
| 5,727,586 | 3/1998 | Taylor | 137/70 |
| 5,860,442 | 1/1999 | Taylor | 137/68.11 |

*Primary Examiner*—Denise L. Ferensic
*Assistant Examiner*—Joanne Y. Kim

[57] ABSTRACT

A right angle relief valve body for high pressure fluid is provided with a bushing type valve seat in the inlet port. A piston valve having rod guide end portions is longitudinally slideable in the valve body toward and away from the inlet port. A sleeve extension of one rod end portion, having longitudinal wall slots intermediate its ends and slidable in the valve seat, closes the inlet port in a first fluid monitoring position and opens the valve fluid passageway when in a second position in response to a predetermined value of fluid pressure acting on a pressure relief member opposite the inlet port.

5 Claims, 3 Drawing Sheets

HIGH PRESSURE RELIEF VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to valves and more particularly to a high pressure fluid relief valve.

1. Field of the Invention

Various types of relief valves for monitoring fluid pressure and releasing the same above a predetermined value are well known. However, relief valves for controlling a relatively high fluid pressure, e.g., 22,222 kg (10,000 psi) and higher requires extra heavy duty structural components and seals for containing such pressures and releasing the same when they exceed a predetermined value. Further, the life of such a valve under such high pressure is relatively short for the reason the seals or valve seats are deteriorated by the high pressure fluid flow during opening and pressure release position. The unique arrangement of such high pressure release of this valve components overcomes the seal deterioration problem and extends the life of this relatively high pressure fluid control valve.

2. Description of the Prior Art

The most pertinent patent is believed to be U.S. Pat. No. 3,794,289 issued Feb. 26, 1974 to Taylor for Pressure Conducting Probe Receiving Plug. This patent discloses a centrally bored plug communicating with fluid pressure in a vessel through the wall thereof, in which a ball valve on a seat normally closes the plug bore and may be unseated by a probe axially entering the plug bore and longitudinally moving an axial rod, disposed therebelow, toward the fluid pressure. The rod is provided with relatively narrow, diametrically opposite, longitudinal wall slots which permit fluid pressure to flow toward the probe across the position of the rod surrounding O-ring seal. The relatively narrow width of the slot relative to the diameter of the surrounding O-ring permits the passage of high pressure fluid without material damage to the O-ring seal.

This invention is believed distinctive over this patent, although employing relatively narrow slots positioned across the position of an O-ring seal in controlling extremely high fluid pressure, this valve has the components of a pressure relief valve as opposed to a plug.

U.S. Pat. No. 3,258,026, issued Jun. 28, 1966 to Weaver for Valve and U.S. Pat. No. 3,342,205 issued Sep. 19, 1967 to Quinto for Slide Valve are believed good examples of the further state-of-the-art. The Weaver patent discloses a sliding spindle between valve ports in which the spindle is provided with longitudinal grooves in its periphery communicating with inlet and outlet ports for allowing or stopping the fluid flow therethrough according to the position of the spindle. The Quinto patent similarly discloses a sliding sleeve having longitudinal slots in its periphery mating and mismating with an inlet port for distributing fluid to multiple ports opposite the inlet port and which may be used in water control to prevent the hammer effect thereof.

BRIEF SUMMARY OF THE INVENTION

A high fluid pressure valve body is centrally bored and counterbored from each end and provided with a lateral bore communicating with the counter bore for forming a fluid passageway through the body between inlet and outlet ports. A valve seat is interposed in the inlet port which slideably receives a sleeve end member of a piston valve slideably supported for longitudinal movement toward and away from the inlet port.

A fluid pressure release member is secured to the valve body opposite its inlet port for releasing the valve to open in response to fluid pressure above a predetermined value allowing the excess fluid pressure to be released through the outlet port.

The principal object of this invention is to provide a high fluid pressure relief valve for releasing fluid pressure downstream when above a predetermined value in which the valve open components are constructed in a manner to provide a relatively long useful life when compared with other high pressure valves and valve seats.

DETAILED DESCRIPTION OF THE INVENTION

Figure 1:
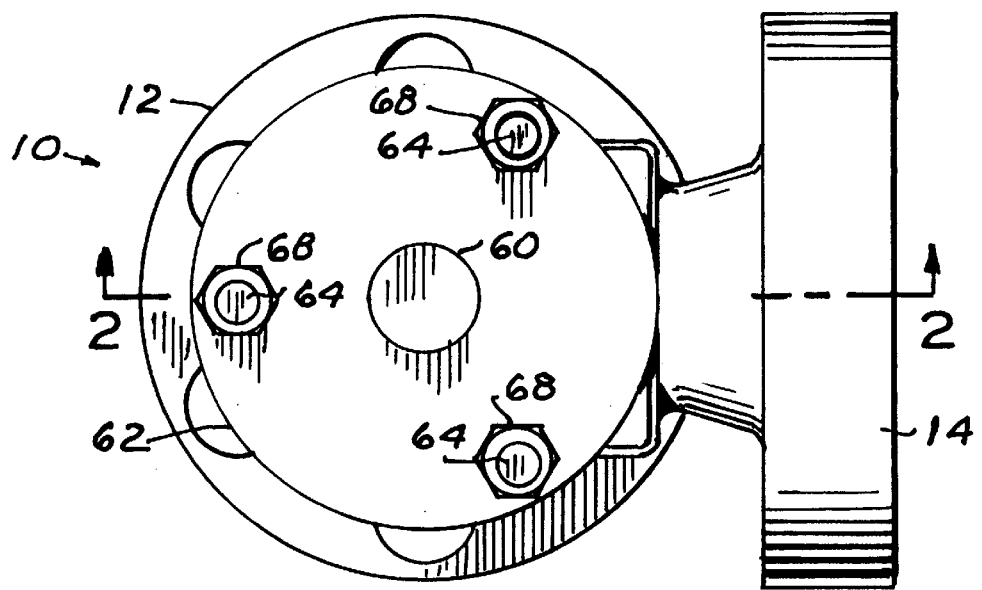
FIG. 1 is a top view.

Like characters of reference designate like parts in those figures of the drawings in which they occur.

In the drawings:

The reference numeral 10 indicates a right angular valve body having bolt flange ends 12 and 14 adapted for connection with cooperating lines or vessels, not shown.

The body is centrally bored, as at 16, and counterbored from respective ends as at 18, 20, and 22. A lateral bore 24, through the bolt flange 14, communicates with a counterbore chamber 21 and forms a fluid passageway 26 between inlet and outlet ports 28 and 30, respectively. A bushing valve seat 32 having a seal ring 17 is secured in the body bore 16. A centrally bored body bonnet 50 forming a fluid pressure sensing and release means 34 is axially secured to the valve body opposite its inlet port 28.

A piston valve 36 having rod end portions is longitudinally disposed in the valve body 10 and includes an annular outstanding flange 38 defining an annular shoulder 39 facing opposite the direction of the inlet port. One end portion 40 of the valve 36 is slideably received by the bonnet 50 and its opposite rod end portion 41 is diametrically reduced to define an axial sleeve-like extension 42 and an annular shoulder 44 facing the inlet port 28 and normally abutting the valve seat 32 when the valve is in closed position.

Intermediate its ends the wall of the valve sleeve portion 42 is provided with two pairs of diametrically opposite circumferentially equally spaced relatively narrow elongated through wall slots 46 of equal length. The length of the slots 46 relative to the distance of longitudinal movement of the valve 36 is such that the slots are fully exposed to the chamber 21 when the valve 36 is in open position. The width of the slots is relatively narrow when compared with the dimensions of adjacent components, for example, approximately 0.381 mm (0.150 inches). The width of the slots relative to the other components is critical in controlling high pressure fluid on the order of magnitude explained hereinabove, so that the O-ring seal 17 surrounding the reduced end portion 42 of the valve 36, will not be deteriorated or cut by the slots 46 moving across the position thereof. Other O-ring 48 seals in the bonnet 50 and periphery of the valve seat 32 insure a fluid tight valve 10.

In one embodiment the pressure responsive member means 34 comprises the valve bonnet 50, secured to the valve body 10 by bolts 51, which axially supports a pin cage means 52 projecting axially beyond the bonnet. The pin cage means 52 comprises a collapsible pin 54 inserted at one end portion in a tapered sleeve insert 56 axially supported in the valve end portion 40 and having its other end portion inserted in a similar insert 58 nested by a socket formed in a holding nut 60 centrally received by a top plate 62 in turn supported by a plurality of posts 64, three (3) in the example shown, surrounded by sleeve spacers 66 and secured by nuts 68.

Figure 6:
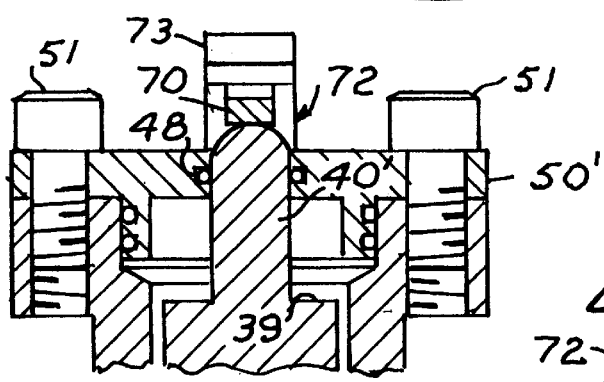
FIG. 6 is a fragmentary vertical cross sectional view taken substantially along the line 6—6 of FIG. 5.
Figure 5:
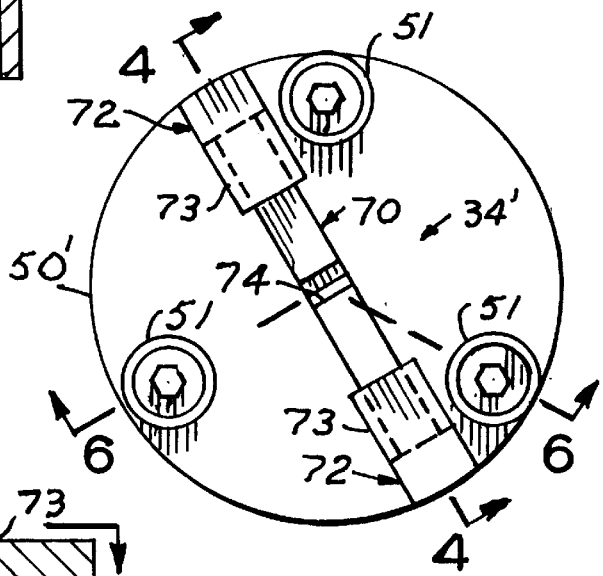
FIG. 5 is a top view of FIG. 4.
Figure 4:
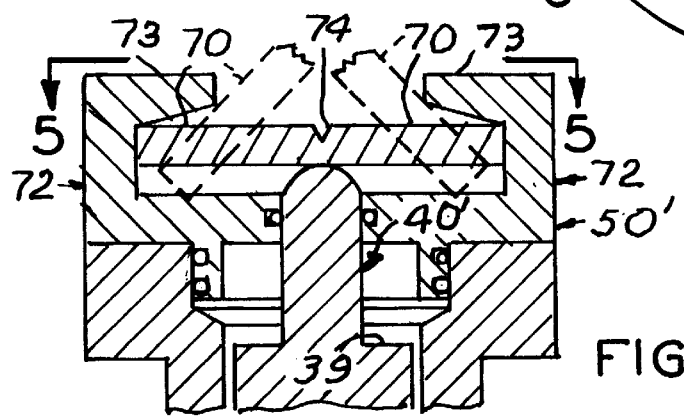
FIG. 4 is a fragmentary vertical cross sectional view taken substantially along the line 4—4 of FIG. 5.

Obviously the fluid pressure sensing means 34 may comprise other configurations such as a frangible disk or a spring, neither being shown, or a frangible bar 70. As illustrated by FIGS. 4–6, an alternative embodiment 34' similarly comprises a bonnet 50' receiving the bolts 51 for connection with the valve body 10. A pair of diametrically opposite inverted L-shaped integral portions 72 having foot portions 73 projecting inward in confronting relation from the periphery of the upper surface of the bonnet 50' and receiving the bar 70 therebetween transversely overlying the upper end of the piston valve rod portion 40.' A central notch in 74 in the upper surface of the bar determines the rupture or yield point of the bar in response to fluid pressure against the piston valve 36 above a predetermined value.

OPERATION

Figure 2:
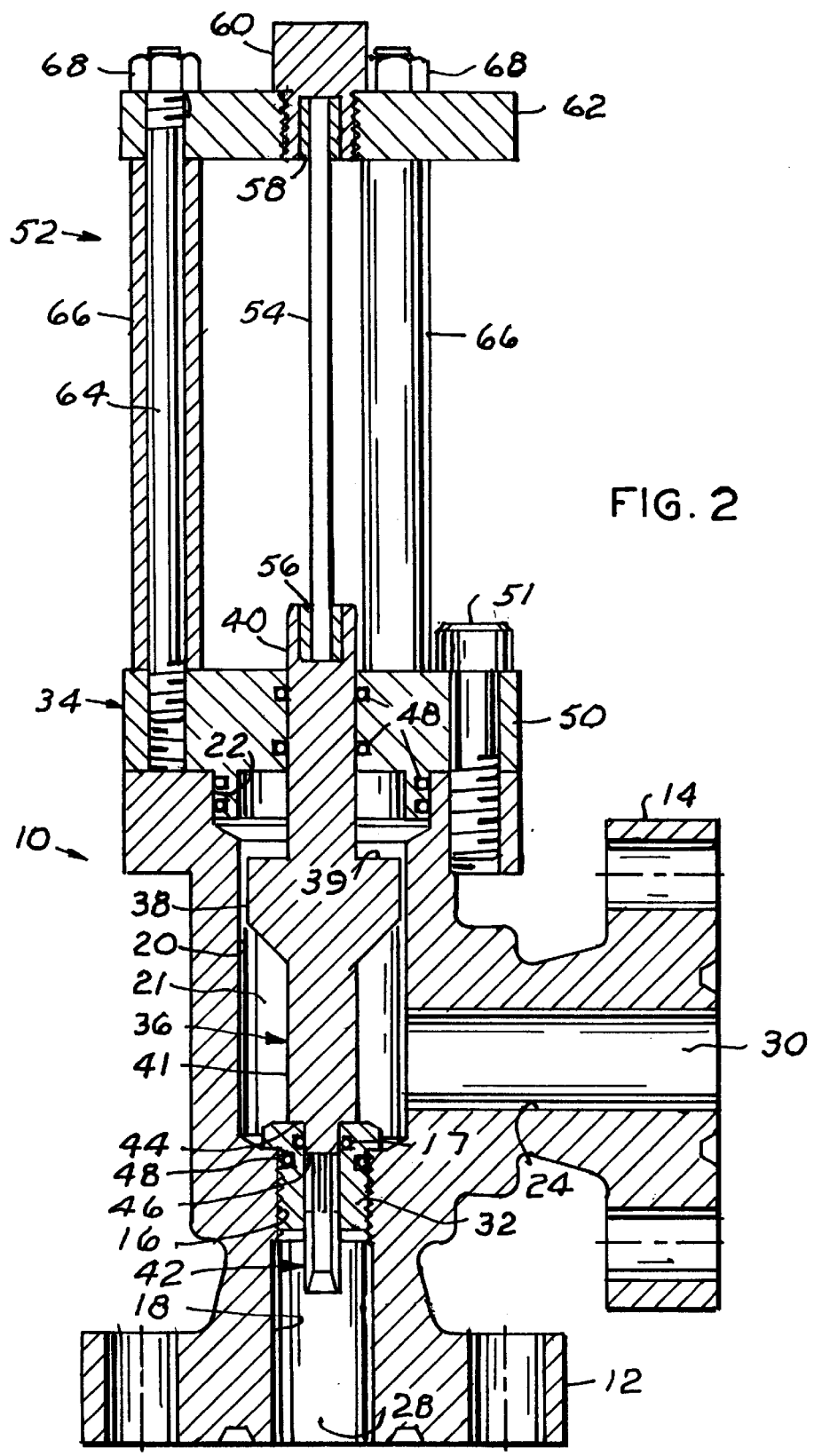
FIG. 2 is a vertical cross sectional view taken substantially along the line 2—2 of FIG. 1.
Figure 3:
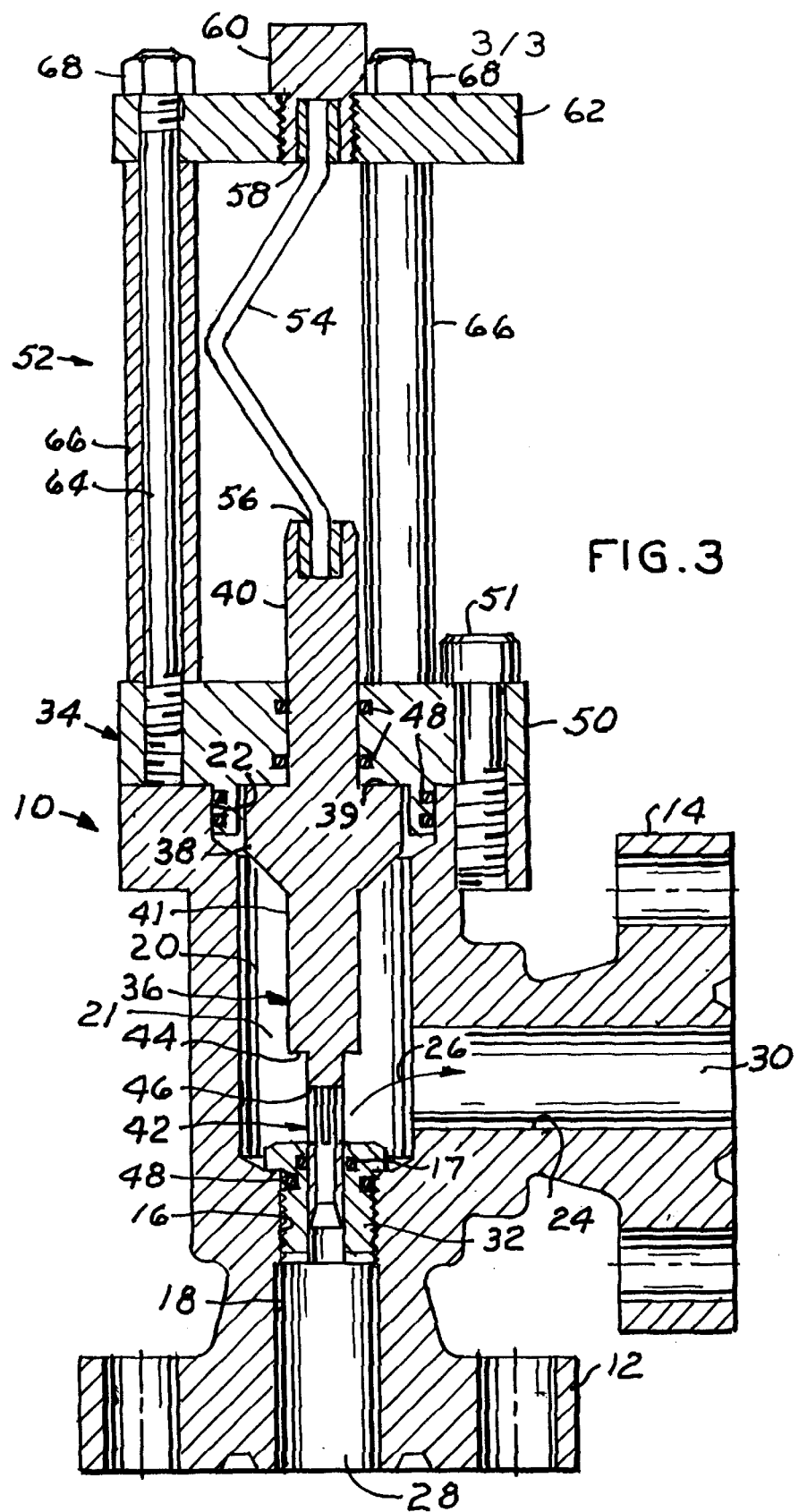
FIG. 3 is vertical cross sectional view similar to FIG. 2, illustrating the valve in fluid discharging position.

In operation of the embodiment illustrated by FIGS. 1–3, the piston valve 36 is normally in the position illustrated by FIG. 2 in which the valve 36 normally remains closed. In the event fluid pressure in the valve inlet port 28 exceeds a predetermined value the fluid pressure against the valve 36 forces it longitudinally upward, as viewed in the drawings, collapsing the pin 54 to the position illustrated by FIG. 3 in which the valve slots 46 are fully exposed in the valve chamber 21, opening the fluid passageway 26. This exhausts the excess pressure and after the fluid pressure has decreased and the problem, if any, has been corrected the valve 10 may be reset by removing the pin nut 60, the collapsed pin 54 and manually forcing the piston valve 36 downwardly to the position illustrated by FIG. 2. Downward movement of the piston valve is interrupted by its shoulder 44 contacting the valve seat bushing 32. A replacement pin, identical with the pin 54, is inserted at one end portion into the sleeve insert 56 and its other end inserted into the pin nut insert 58 while the latter is replaced in the top plate 62.

Operation of the alternative embodiment, as illustrated by FIGS. 4–6, is substantially identical with that described hereinabove for the release of fluid pressure by moving the piston valve 36 to a passageway open position. Longitudinal movement of the piston valve against the frangible bar 70 ruptures the latter, as illustrated by dotted lines (FIG. 4). Similarly this embodiment of the valve 10 may be reset by manually forcing the piston valve 36 to its valve closed position and inserting a replacement frangible bar 70 under the overhanging foot portion of the respective leg 72.

What is claimed is:

1. A heavy duty relief valve for monitoring fluid under high pressure, comprising:

a valve body adapted to be connected with a fluid container and having a first bore forming an inlet port at the upstream end and having a second bore intersecting the first bore and forming an outlet port and a fluid passageway therebetween;

a valve seat adjacent the inlet port;

a piston valve having rod-like axial end portions longitudinally slideable in the first bore toward and away from the inlet port and having a slotted wall sleeve at one end portion normally closing the fluid passageway; and, a fluid pressure sensing means secured to said body opposite the inlet port and normally maintaining said piston valve in inlet port closed position for releasing said piston valve and opening the fluid passageway in response to fluid pressure above a predetermined value.

2. The relief valve according to claim 1 in which the sensing means includes:

pin means including an axially collapsible pin supported in axial outstanding relation with respect to said piston valve for normally maintaining said piston valve in passageway closed position.

3. The relief valve according to claim 2 in which the pin means comprises:

pin cage means including a top plate secured to said valve body in axial spaced relation with respect to the outwardly projecting end of said piston valve; and, an elongated rod-like pin axially extending between said piston valve and said top plate.

4. The relief valve according to claim 3 in which the pin cage means further includes:

a plurality of post means including a like plurality of bolts surrounding said pin in radially spaced relation for connecting said top plate with said valve body.

5. The relief valve according to claim 1 in which the sensing means includes:

a centrally bored bonnet secured to the end of said valve body opposite the inlet port and slideably receiving the adjacent end portion of said piston valve;

a frangible bar transversely overlying the adjacent end portion of the piston valve; and, inverted L-shaped members on said bonnet nesting respective end portions of said bar.

* * * * *